(12) United States Patent
Xu et al.

(10) Patent No.: US 11,740,385 B2
(45) Date of Patent: Aug. 29, 2023

(54) QUANTITATIVE ASSESSMENT METHOD, APPARATUS, AND DEVICE FOR GLOBAL STABILITY OF SURROUNDING ROCKS OF UNDERGROUND CAVERNS

(71) Applicant: Institute of Rock and Soil Mechanics, Chinese Academy of Sciences, Wuhan (CN)

(72) Inventors: Dingping Xu, Wuhan (CN); Quan Jiang, Wuhan (CN); Xiating Feng, Wuhan (CN); Shaojun Li, Wuhan (CN); Xiuyang Liu, Wuhan (CN); Guangliang Feng, Wuhan (CN); Shuling Huang, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 0 days.

(21) Appl. No.: 18/077,004

(22) Filed: Dec. 7, 2022

(65) Prior Publication Data
US 2023/0176245 A1    Jun. 8, 2023

(30) Foreign Application Priority Data
Dec. 8, 2021 (CN) .......................... 202111487342.7

(51) Int. Cl.
*G01V 99/00* (2009.01)
(52) U.S. Cl.
CPC .................................. *G01V 99/00* (2013.01)
(58) Field of Classification Search
None
See application file for complete search history.

(56) References Cited

U.S. PATENT DOCUMENTS

2011/0015907 A1* 1/2011 Crawford ............... G01V 99/00
703/2

FOREIGN PATENT DOCUMENTS

| CN | 107066660 A | * | 8/2017 | ......... G06F 17/5004 |
| CN | 111666624 A | | 9/2020 | |
| CN | 113153348 A | * | 7/2021 | ............... E21D 9/14 |

OTHER PUBLICATIONS

CNIPA, Notification of a First Office Action for CN202111487342.7, dated Feb. 28, 2022.

(Continued)

Primary Examiner — Lina Cordero
(74) Attorney, Agent, or Firm — Zhigang Ma

(57) ABSTRACT

The present application provides a quantitative assessment method, apparatus and device for global stability of surrounding rocks of underground caverns, which are configured to provide a concrete, practical and effective quantitative assessment solution for a global stability state of the surrounding rocks of the underground caverns. The quantitative assessment method for global stability of surrounding rocks of underground caverns includes: extracting, after determining an assessment task for the global stability of the surrounding rock of a target underground cavern, initial data of the target underground cavern; dividing, according to the initial data, the target underground cavern into different independent cavern units or cavern sections; and rating, according to a preset stability assessment strategy, the eight factors influencing the stability of surrounding rocks of cavern units or the cavern sections are rated respectively, as a global stability assessment result of the target underground cavern.

3 Claims, 3 Drawing Sheets

(56) References Cited

OTHER PUBLICATIONS

Institute of Rock and Soil Mechanics, Chinese Academy of Sciences (Applicant), Reply to Notification of a First Office Action for CN202111487342.7, w/ replacement claims, dated Mar. 30, 2022.
Institute of Rock and Soil Mechanics, Chinese Academy of Sciences (Applicant), Supplemental Reply to Notification of a First Office Action for CN202111487342.7, w/ (allowed)replacement claims, dated Apr. 28, 2022.
CNIPA, Notification to grant patent right for invention in CN202111487342.7, dated May 19, 2022.

* cited by examiner

QUANTITATIVE ASSESSMENT METHOD, APPARATUS, AND DEVICE FOR GLOBAL STABILITY OF SURROUNDING ROCKS OF UNDERGROUND CAVERNS

TECHNICAL FIELD

The present application relates to the technical field of geotechnical engineering, in particular to a quantitative assessment method, apparatus, and device for the global stability of surrounding rocks of underground caverns.

BACKGROUND

With the rapid development of the national economy, the demand for energy exploitation and underground space development in China presents explosive growth, so the construction of underground caverns tends to be normal. Global stability assessment of surrounding rocks of underground caverns has increasingly become an unavoidable technical problem in the development and utilization of underground spaces.

However, in the research process of existing related arts, the inventors found that up to now, there is no comprehensive, fast, effective, and standardized quantitative assessment technology for the global stability of surrounding rocks of underground caverns.

SUMMARY

The present application provides a quantitative assessment method, apparatus, and device for global stability of surrounding rocks of underground caverns configured for global stability assessment of surrounding rocks of underground caverns, and provides a concrete, practical and effective quantitative assessment method.

In the first aspect, the present application provides a quantitative assessment method for the global stability of surrounding rocks of underground caverns. The method includes:

extracting, after determining an assessment task for global stability of a surrounding rock of a target underground cavern, initial data of the target underground cavern;

dividing, according to the initial data, the target underground cavern into different independent cavern units or cavern sections; and rating, according to a preset stability assessment strategy, the eight factors influencing the stability of surrounding rocks of cavern units or the cavern sections respectively, as a global stability assessment result of the target underground cavern.

In combination with the first aspect of the present application, in a first possible implementation of the first aspect of the present application, dividing, according to the initial data, the target underground cavern into different independent cavern units or cavern sections includes:

dividing, according to geological structures, rock mass structure types, lithology, initial maximum principal stress values, buried depths, included angles between initial maximum principal stress directions and a cavern axis, dimensions, a cavern axis orientation and use functions of different positions carried in the initial data, the target underground cavern into different independent cavern units or cavern sections in a preset similar judgment range.

In combination with the first aspect of the present application, in a second possible implementation of the first aspect of the present application, the preset stability assessment strategy evaluates from eight aspects: a basic quality index of the surrounding rock, an uniaxial compressive strength of the surrounding rock, a local stability condition of the surrounding rock, a relaxation/damage condition of the surrounding rock, a combined relationship between the initial maximum principal stress direction of the surrounding rock and the cavern axis, a combined relationship between a main structural plane and the cavern axis, groundwater and other influencing factors.

In combination with the second possible implementation of the first aspect of the present application, in a third possible implementation of the first aspect of the present application, the local stability condition of the surrounding rock is specifically evaluated from four aspects: a local deformation stability of the surrounding rock, block stability of the surrounding rock, a collapse tendency of the surrounding rock and a rockburst tendency of the surrounding rock.

In combination with the first aspect of the present application, in a fourth possible implementation of the first aspect of the present application, rating, according to a preset stability assessment strategy, the eight factors influencing the stability of surrounding rocks of cavern units or the cavern sections respectively, as a global stability assessment result of the target underground cavern includes:

rating, according to the preset stability assessment strategy, the eight factors influencing the stability of the surrounding rock of cavern units or the cavern sections respectively; and accumulating ratings of the eight influencing factors, and confirming accumulated ratings as stability assessment results of respective cavern units or cavern sections, as the global stability assessment result of the target underground cavern.

In combination with the fourth possible implementation of the first aspect of the present application, in a fifth possible implementation of the first aspect of the present application, accumulating ratings of the eight influencing factors, and confirming accumulated ratings as stability assessment results of respective cavern units or cavern sections includes:

accumulating the ratings of the eight influencing factors;

determining, based on preset global stability classifications of the surrounding rock of the underground cavern and rating ranges thereof, target global stability classifications corresponding to the accumulated rating values, the global stability classifications of the surrounding rock of the cavern units or cavern sections being divided into four classifications: stable, basically stable, understable, and unstable; and confirming the accumulated rating values and the target global stability classifications as the stability assessment results of respective cavern units or cavern sections, as the global stability assessment result of the target underground cavern.

In combination with the first aspect of the present application, in a sixth possible implementation of the first aspect of the present application, corresponding ranges are set for defined ranges involved in the cavern units or cavern sections and rating ranges involved in the rating according to a survey and design stage and a construction stage.

In a second aspect, the present application provides a quantitative assessment apparatus for the global stability of surrounding rocks of underground caverns. The apparatus includes:

an extracting unit configured to extract, after determining an assessment task for global stability of a surrounding rock of a target underground cavern, initial data of the target underground cavern;

a dividing unit configured to divide, according to the initial data, the target underground cavern into different independent cavern units or cavern sections; and a rating unit configured to rate, according to a preset stability assessment strategy, the eight factors influencing the stability of surrounding rocks of cavern units or the cavern sections respectively, as a global stability assessment result of the target underground cavern.

In combination with the first aspect of the present application, in the first possible implementation of the first aspect of the present application, dividing, according to the initial data, the target underground cavern into different independent cavern units or cavern sections includes:

dividing, according to geological structures, rock mass structure types, lithology, initial maximum principal stress values, buried depths, included angles between initial maximum principal stress directions and a cavern axis, dimensions, a cavern axis orientation and use functions of different positions carried in the initial data, the target underground cavern into different independent cavern units or cavern sections in a preset similar judgment range.

In combination with the second aspect of the present application, in a second possible implementation of the second aspect of the present application, the preset stability assessment strategy evaluates from eight aspects: a basic quality index of the surrounding rock, an uniaxial compressive strength of the surrounding rock, a local stability condition of the surrounding rock, a relaxation/damage condition of the surrounding rock, a combined relationship between the initial maximum principal stress direction of the surrounding rock and the cavern axis, a combined relationship between a main structural plane and the cavern axis, groundwater and other influencing factors.

In combination with the second possible implementation of the second aspect of the present application, in a third possible implementation of the second aspect of the present application, the local stability condition of the surrounding rock is specifically evaluated from four aspects: a local deformation stability of the surrounding rock, a block stability of the surrounding rock, a collapse tendency of the surrounding rock and a rockburst tendency of the surrounding rock.

In combination with the second aspect of the present application, in a fourth possible implementation of the second aspect of the present application, the rating unit is specifically configured to:

rate, according to the preset stability assessment strategy, the eight factors influencing the stability of the surrounding rock of cavern units or the cavern sections respectively; and accumulate ratings of the eight influencing factors, and confirm accumulated rating values as stability assessment results of respective cavern units or cavern sections, as the global stability assessment result of the target underground cavern.

In combination with the fourth possible implementation of the second aspect of the present application, in a fifth possible implementation of the second aspect of the present application, the rating unit is specifically configured to:

accumulate the ratings of the eight influencing factors;

determine, based on preset global stability classifications of the surrounding rock of the underground cavern and rating ranges thereof, target global stability classifications corresponding to the accumulated ratings, the global stability classifications of the surrounding rock of the cavern units or cavern sections being divided into four classifications: stable, basically stable, understable, and unstable; and confirm the accumulated ratings and the target global stability classifications as the stability assessment results of respective cavern units or cavern sections, as the global stability assessment result of the target underground cavern.

In combination with the second aspect of the present application, in a sixth possible implementation of the second aspect of the present application, corresponding ranges are set for defined ranges involved in the cavern units or cavern sections and rating ranges involved in the rating according to a survey and design stage and a construction stage.

In a third aspect, the present application provides a quantitative assessment device for the global stability of surrounding rocks of underground caverns, which includes a processor and a memory, a computer program is stored in the memory, and the processor executes the method according to the first aspect or any possible implementation of the first aspect of the present application when calling the computer program in the memory.

In a fourth aspect, the present application provides a computer-readable storage medium, and the computer-readable storage medium stores various instructions which are suitable for being loaded by a processor to execute the method according to the first aspect or any possible implementation of the first aspect of the present application.

From the above content, it can be seen that the present application has the following beneficial effects:

For the assessment of the global stability of surrounding rocks of underground caverns, the present application firstly divides the target underground cavern to be subjected to stability assessment into different independent cavern units or cavern sections according to the initial data and carries out multi-factor assessment processing on the global stability of surrounding rocks of these cavern units or cavern sections according to the preset stability assessment strategy to obtain the global stability assessment results of the surrounding rock of the cavern units or cavern sections. In this assessment process, the global stability state of the surrounding rock of the underground cavern can be quickly, effectively, and accurately judged, and a concrete, practical and effective quantitative assessment solution is realized and provides strong data guidance for engineering practice work involved in the underground cavern.

BRIEF DESCRIPTION OF DRAWINGS

In order to describe the technical solutions in the embodiments of the present application more clearly, the following briefly introduces the accompanying drawings required for describing the embodiments. The accompanying drawings in the following description are merely some embodiments of the present application, and those ordinary skilled in the art may still derive other drawings from these accompanying drawings without creative efforts.

DETAILED DESCRIPTION OF EMBODIMENTS

Figure 1:
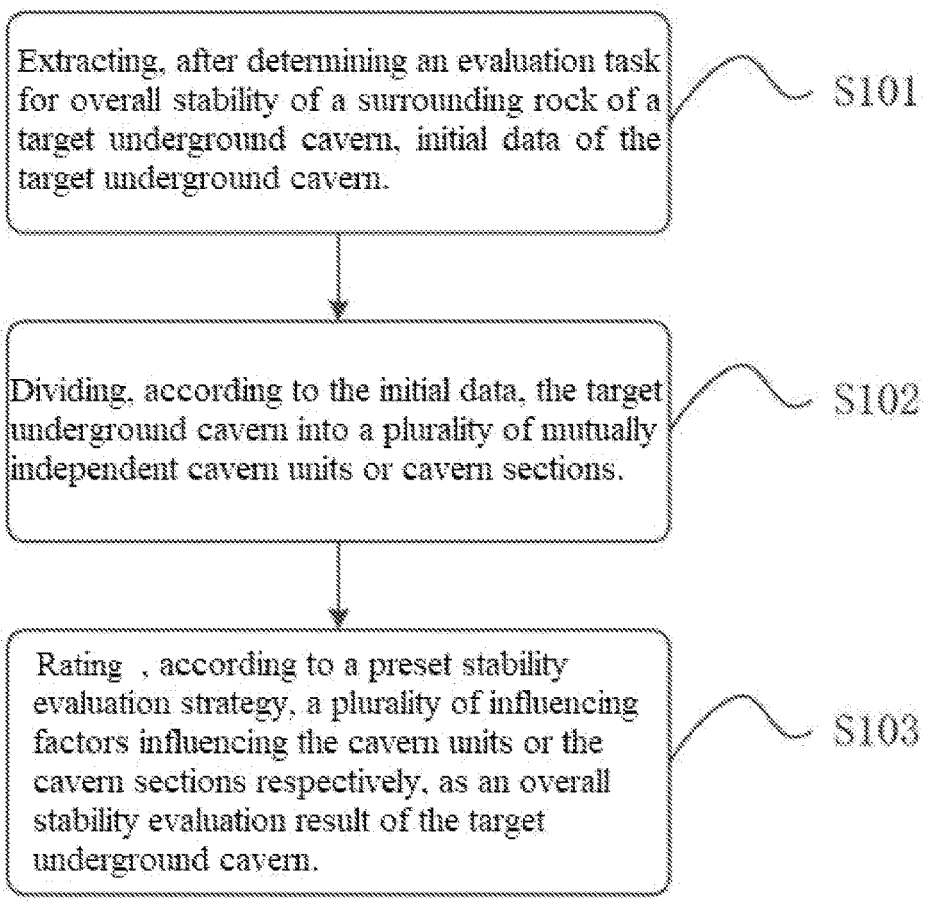
FIG. 1 is a flowchart of a quantitative assessment method for the global stability of surrounding rocks of underground caverns of the present application.

The technical solutions in the embodiments of the present application will be clearly and completely described below in combination with the accompanying drawings in the embodiments of the present application. It is obvious that the described embodiments are only part but not all of the embodiments of the present application. All other embodiments obtained by those skilled in the art without creative efforts based on the embodiments in the present application are within the protection scope of the present application.

The terms such as "first" and "second" in the description and claims of the present application and the above drawings are configured to distinguish similar objects and are not necessarily configured to describe a specific order or sequence. It should be understood that the data used in this way can be interchanged under appropriate circumstances so that the embodiments described here can be implemented in a sequence other than those illustrated or described here. In addition, the terms "include" and "have" and any variations thereof are intended to cover non-exclusive inclusions. For example, the processes, methods, systems, products, or devices that include a series of steps or modules are not necessarily limited to those steps or modules that are listed but may include other steps or modules that are not clearly listed or inherent to these processes, methods, products or devices. Names or numbers of the steps in the present application do not mean that the steps in the method process must be executed in the time/logical sequence indicated by the names or numbers. The execution sequence of the named or numbered process steps can be changed according to the technical purpose to be achieved, as long as the same or similar technical effects can be achieved.

The division of the modules in the present application is only a logical division. In actual implementation, there may exist other division manners. For example, multiple modules may be combined or integrated into another system, or some features may be ignored or not executed. In addition, the mutual coupling or direct coupling, or communication connection shown or discussed may be indirect coupling or communication connection by certain interfaces and modules, or electrical connection, or the connection of other forms, which is not limited by the present application. Besides, the modules or sub-modules described as separate components may or may not be physically separate, may or may not be physical modules, or may be distributed to multiple circuit modules. Part or all of the modules may be selected according to actual needs to achieve the objectives of the solutions of the present application.

Before introducing the quantitative assessment method for global stability of surrounding rocks of underground caverns according to the present application, the background content involved in the present application is firstly introduced.

The quantitative assessment method and apparatus for global stability of surrounding rocks of underground caverns and the computer-readable storage medium can provide a concrete, practical and effective quantitative assessment solution for the global stability of surrounding rocks of underground caverns.

An execution subject of the quantitative assessment method for the global stability of surrounding rocks of underground caverns mentioned in the present application may be the quantitative assessment apparatus for the global stability of surrounding rocks of underground caverns, or different types of quantitative assessment devices for the global stability of surrounding rocks of underground caverns, such as servers, physical hosts or User Equipment (UE) integrated with such a quantitative assessment apparatus for the global stability of surrounding rocks of underground caverns. The quantitative assessment apparatus for the global stability of surrounding rocks of underground caverns may be implemented by hardware or software, and the UE may be a terminal device such as a smart phone, a tablet computer, a notebook computer, a desktop computer, or a Personal Digital Assistant (PDA). The quantitative assessment and processing device for the global stability of surrounding rocks of underground caverns may be set using a device cluster.

Next, the quantitative assessment method for the global stability of surrounding rocks of underground caverns according to the present application is introduced firstly.

Firstly, referring to FIG. 1, FIG. 1 shows a flowchart of the quantitative assessment method for the global stability of surrounding rocks of underground caverns of the present application. The quantitative assessment method for the global stability of surrounding rocks of underground caverns according to the present application may specifically include the following steps S101 to S103:

S101, after determining an assessment task for the global stability of the surrounding rock of a target underground cavern, initial data of the target underground cavern are extracted.

It can be understood that the assessment for the global stability of the surrounding rock of the target underground cavern of the present application is based on small-unit cavern units or cavern sections of the target underground cavern. Under this principle, after the assessment task for the global stability of the surrounding rock of the target underground cavern is triggered, the current assessment object, that is, the target underground cavern can be divided into different independent cavern units or cavern sections under a preset similar judgment standard at an early stage of task execution, and these cavern units or cavern sections are used as assessment objects of the global stability of the surrounding rock.

The division of the target underground cavern is based on the initial data, and the initial data is easy to understand, is preliminary data of the target underground cavern when the task for the global stability of the surrounding rock is initiated and provides data basis for subsequent division.

It should be noted that the initial data may be directly carried in task data, or extracted from local or other devices storing the data.

S102, the target underground cavern is divided into different independent cavern units or cavern sections according to the initial data.

In the division processing of the target underground cavern, the principle of similarity is followed, and the cavern units or cavern sections with similar properties on an engineering geological unit are divided into different independent cavern units or cavern sections.

As a practical implementation, in the present application, the division of the target underground cavern may specifically include:

according to geological structures, rock mass structure types, lithology, initial maximum principal stress values, buried depths, included angles between initial maximum principal stress directions and a cavern axis, dimensions, a cavern axis orientation and use functions of different positions carried in the initial data, dividing different positions of the target underground cavern into different independent cavern units or cavern sections within a preset similar judgment range.

the initial maximum principal stress value, the buried depth, and the included angle between the initial maximum principal stress direction and the cavern axis belong to the category of "initial ground stress"; and the dimension, the cavern axis orientation, and the use functions belong to the category of "cavern scale and layout".

In addition to classifying the categories of influencing factors, in practical application, a similar judgment range suitable for each category may also be configured.

S103, according to a preset stability assessment strategy, the eight factors influencing the global stability of surrounding rocks of the cavern units or cavern sections are rated respectively, as the global stability assessment result of the target underground cavern.

After it is determined that the target underground cavern will be divided into multiple cavern units or cavern sections, these cavern units or cavern sections may be independently subjected to assessment processing for the global stability of the surrounding rock.

It can be understood that the assessment strategy involved in the stability assessment processing here may be pre-configured with corresponding assessment content according to the assessment requirements in practical application.

As another practical implementation, in the present application, the preset stability assessment strategy may specifically rate from eight aspects (influencing factors): a basic quality index of the surrounding rock, an uniaxial compressive strength of the surrounding rock, a local stability condition of the surrounding rock, a relaxation/damage condition of the surrounding rock, a combined relationship between the initial maximum principal stress direction of the surrounding rock and the cavern axis, a combined relationship between a main structural plane and the cavern axis, groundwater and other influencing factors.

The local stability rating of the surrounding rock of the same unit or cavern section of a single failure type may take the lowest value of all ratings of this type, and the local stability rating of the surrounding rock of the same unit or cavern section may take the rating corresponding to the most unfavorable type of each failure type.

For a single cavern unit or cavern section, after eight influencing factors are rated by the preset stability assessment strategy, the ratings of eight influencing factors may also be accumulated, and the accumulated ratings are confirmed as the global stability assessment results of the surrounding rock of respective cavern units or cavern sections, as the global stability assessment result of the target underground cavern.

In addition, it is easy to understand that, in practical application, corresponding weight values may also be configured for eight influencing factors involved in the stability assessment process, to finally obtain the global stability ratings of the surrounding rock of different cavern units or sections.

Of course, for different influencing factors or even different cavern units or cavern sections involved in the stability assessment process, in practical application, different adaptation strategies and inclination strategies may also be configured according to different requirements, so that the global stability ratings of the surrounding rock of different cavern units or cavern sections can be finally obtained, and more accurate determination and presentation effects can be obtained according to actual situations.

In addition, the stability assessment result based on the ratings may also include other contents, to better indicate specific stability degrees, and the stability degrees may be divided according to the specific ratings.

For example, as yet another practical implementation, the process of obtaining the stability assessment result based on the ratings may specifically include:

accumulating ratings of the eight influencing factors;

determining, based on the preset global stability classifications of the surrounding rock of the underground cavern and rating ranges thereof, a target global stability classification corresponding to the accumulated rating, the global stability classifications of the surrounding rock of the underground cavern is divided into four classifications: stable, basically stable, understable and unstable respectively; and confirming the accumulated ratings and the target global stability classifications as the global stability assessment results of the surrounding rock of respective cavern units or cavern sections, as the global stability assessment result of the target underground cavern.

It can be understood that under this setting, in addition to the basic ratings (accumulated ratings), the global stability classifications are also introduced, so that the specific stability degree of the target underground cavern can be indicated in combination with the ratings and the global stability classifications in an intuitive and concrete presentation way.

As yet another example, in the practical application of the present application, the highest value of the global stability rating of the surrounding rock of the underground cavern may be 100, and the lowest value may be 0.

In addition, the upper and lower limits of the rating interval corresponding to the global stability classification of the surrounding rock of the underground cavern are up to the nearest multiple of 10 based on the sum of the upper and lower limits of the rating interval of each influencing factor.

In addition, for the above content, for defined ranges involved by the cavern units or cavern sections, or the rating ranges (corresponding to the stability assessment strategy) involved in rating, in yet another practical implementation, the corresponding ranges may also be set according to two different stages, that is, a survey and design stage and a construction stage. Therefore, in practical application, the stability assessment processing performed in the present application can be accurately adapted to the survey and design stage and the construction stage, thereby avoiding the problem of different assessment results for the global stability of the surrounding rock caused by different survey depths and detection depths of engineering geological conditions in different stages, and possible changes of an excavation and support design solution.

Figure 2:
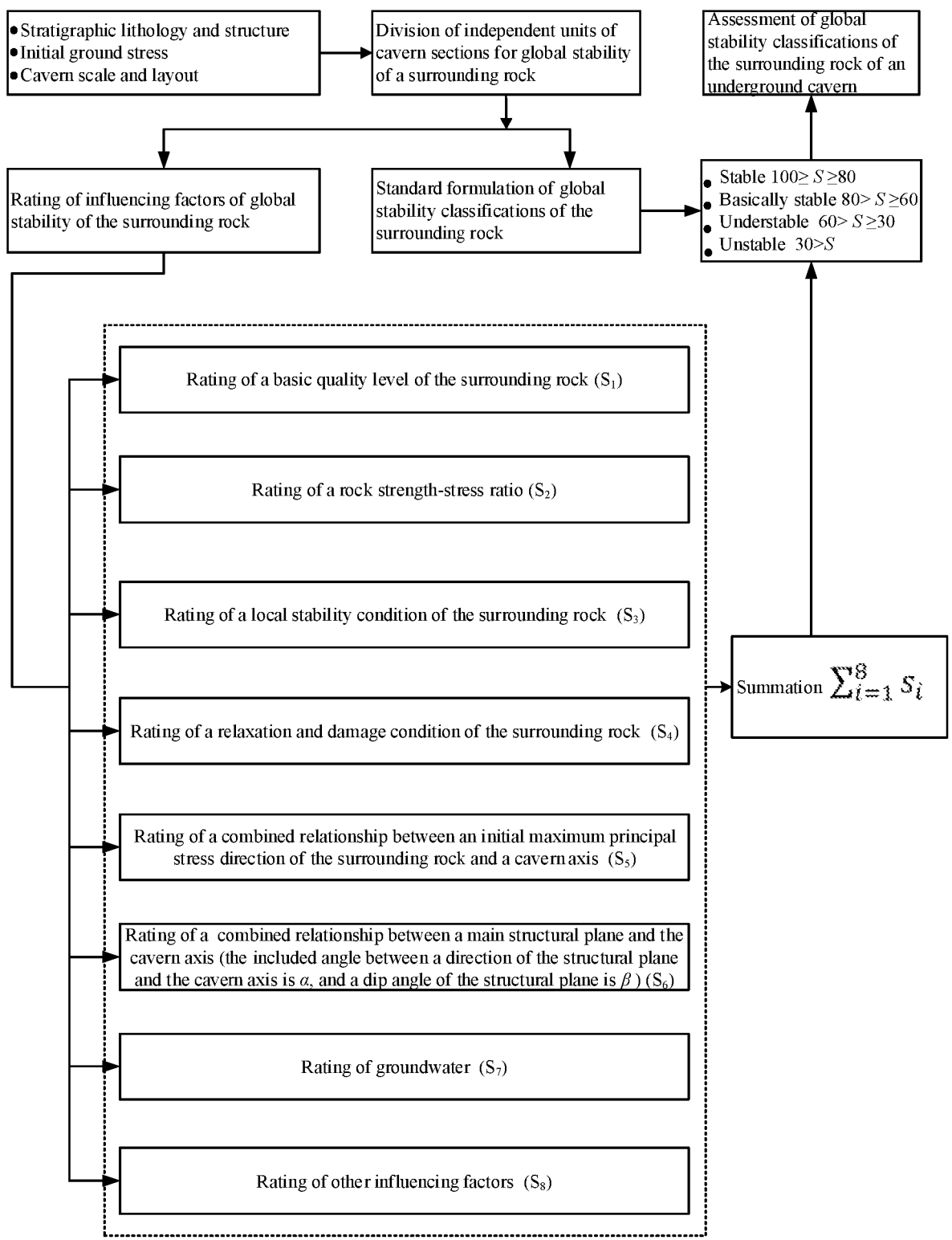
FIG. 2 is a scenario schematic diagram of a quantitative assessment method for global stability of surrounding rocks of underground caverns of the present application.

Specifically, the above content (including respective exemplary implementations) may also be understood in combination with a scenario schematic diagram of the quantitative assessment method for the global stability of surrounding rocks of underground caverns in the present application shown in FIG. 2.

Generally speaking, it can be seen from the above content that, for the assessment of the global stability of surrounding rocks of underground caverns, the present application firstly divides the target underground cavern to be subjected to stability assessment into different independent cavern units or cavern sections according to the initial data, and carries out multi-factor assessment processing on the global stability of the surrounding rock of these cavern units or cavern sections according to the preset stability assessment strategy to obtain the global stability assessment results of the surrounding rock of the cavern units or cavern sections. In this assessment process, the global stability state of the surrounding rock of the underground cavern can be quickly, effectively, and accurately judged, and a concrete, practical and effective quantitative assessment solution is realized and provides strong data guidance for engineering practice work involved in the underground cavern.

The above is the introduction of the quantitative assessment method for the global stability of surrounding rocks of underground caverns according to the present application. To better implement the quantitative assessment method for the global stability of surrounding rocks of underground caverns according to the present application, the present application also provides a quantitative assessment apparatus for the global stability of surrounding rocks of underground caverns from the perspective of functional modules.

Figure 3:
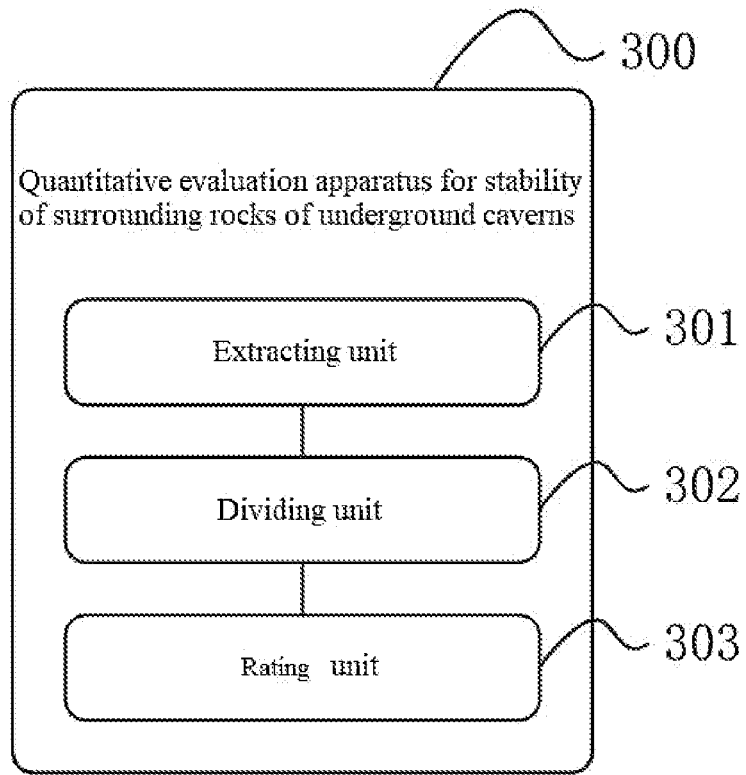
FIG. 3 is a structural schematic diagram of a quantitative assessment apparatus for global stability of surrounding rocks of underground caverns of the present application.

Referring to FIG. 3, FIG. 3 is a structural schematic diagram of the quantitative assessment apparatus for the global stability of surrounding rocks of underground caverns. In the present application, the quantitative assessment apparatus 300 for the global stability of surrounding rocks of underground caverns may specifically include the following structures:

an extracting unit 301 configured to extract, after determining an assessment task for global stability of a surrounding rock of a target underground cavern, initial data of the target underground cavern;

a dividing unit 302 configured to divide, according to the initial data, the target underground cavern into different independent cavern units or cavern sections; and a rating unit 303 configured to rate, according to a preset stability assessment strategy, the eight factors influencing the stability of surrounding rocks of cavern units or the cavern sections respectively, as a global stability assessment result of the target underground cavern.

In yet another exemplary implementation, the dividing unit is specifically configured to:

divide, according to geological structures, rock mass structure types, lithology, initial maximum principal stress values, buried depths, included angles between initial maximum principal stress directions and a cavern axis, dimensions, a cavern axis orientation and use functions of different positions carried in the initial data, the target underground cavern into different independent cavern units or cavern sections in a preset similar judgment range.

In yet another exemplary implementation, the preset stability assessment strategy evaluates from eight aspects: a basic quality index of the surrounding rock, an uniaxial compressive strength of the surrounding rock, a local stability condition of the surrounding rock, a relaxation/damage condition of the surrounding rock, a combined relationship between the initial maximum principal stress direction of the surrounding rock and the cavern axis, a combined relationship between a main structural plane and the cavern axis, groundwater and other influencing factors.

In yet another exemplary implementation, the local stability condition of the surrounding rock is specifically evaluated from four aspects: a local deformation stability of the surrounding rock, a block stability of the surrounding rock, a collapse tendency of the surrounding rock, and a rockburst tendency of the surrounding rock.

In yet another exemplary implementation, the rating unit 303 is specifically configured to:

rate, according to the preset stability assessment strategy, the eight factors influencing the stability of the surrounding rock of cavern units or the cavern sections respectively; and accumulate ratings of the eight influencing factors, and confirm accumulated ratings as stability assessment results of respective cavern units or cavern sections, as the global stability assessment result of the target underground cavern.

In yet another exemplary implementation, the rating unit 303 is specifically configured to:

accumulate the ratings of the eight influencing factors;

determine, based on preset global stability classifications of the surrounding rock of the underground cavern and rating ranges thereof, target global stability classifications corresponding to the accumulated ratings, the global stability classifications of the surrounding rock of the cavern units or cavern sections being divided into four classifications: stable, basically stable, understable and unstable; and confirm the accumulated ratings and the target global stability classifications as the stability assessment results of respective cavern units or cavern sections, as the global stability assessment result of the target underground cavern.

In yet another exemplary implementation, corresponding ranges are set for defined ranges involved in the cavern units or cavern sections and rating ranges involved in the rating according to a survey and design stage and a construction stage.

Figure 4:
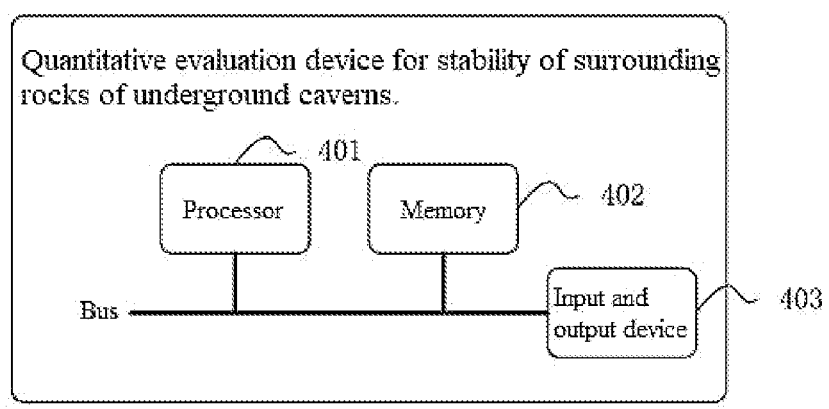
FIG. 4 is a structural schematic diagram of a quantitative assessment device for the global stability of surrounding rocks of underground caverns of the present application.

The present application also provides a quantitative assessment device for the global stability of surrounding rocks of underground caverns from the perspective of a hardware structure. Referring to FIG. 4, FIG. 4 shows a structural schematic diagram of the quantitative assessment device for the global stability of surrounding rocks of underground caverns of the present application. Specifically, the quantitative assessment device for the global stability of surrounding rocks of underground caverns of the present application may include a processor 401, a memory 402, and an input and output device 403. The processor 401 is configured to implement respective steps of the quantitative assessment method for the global stability of surrounding rocks of underground caverns in the corresponding embodiment of FIG. 1 when executing a computer program stored in the memory 402. Alternatively, the processor 401 is configured to realize the functions of respective units in the corresponding embodiment of FIG. 3 when executing the computer program stored in the memory 402, and the memory 402 is configured to store the computer program required by the processor 401 to execute the quantitative assessment method for the global stability of surrounding rocks of underground caverns in the corresponding embodiment of FIG. 1.

Exemplarily, the computer program may be divided into one or more modules/units, which are stored in the memory 402 and executed by the processor 401 to complete the present application. The one or more modules/units may be a series of computer program instruction segments capable of finishing specific functions, and the instruction segments are configured to describe the execution process of the computer program in a computer apparatus.

The quantitative assessment device for the global stability of surrounding rocks of underground caverns may include, but not limited to, the processor 401, the memory 402, and the input and output device 403. Those skilled in the art may understand that the illustration is only an example of the quantitative assessment device for the global stability of surrounding rocks of underground caverns, and does not constitute a limitation on the quantitative assessment device for the global stability of surrounding rocks of underground caverns. The device may include more or less components than those illustrated, or combine some components or different components. For example, the quantitative assessment device for the global stability of surrounding rocks of underground caverns may also include a network access device, a bus, etc. The processor 401, the memory 402 and the input and output device 403 are connected through the bus.

The processor 401 may be a Central Processing Unit (CPU), or other general-purpose processors, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. The general-purpose processor may be a microprocessor or the processor may be any conventional processor, etc. The processor is a control center of the quantitative assessment device for the global stability of surrounding rocks of underground caverns, and connects all parts of the whole device with various interfaces and lines.

The memory 402 may be configured to store the computer program and/or modules, and the processor 401 realizes various functions of the computer apparatus by running or executing the computer program and/or modules stored in the memory 402 and calling the data stored in the memory 402. The memory 402 may mainly include a storage program area and a storage data area, wherein the storage program area may store an operating system, an application program required by at least one function, etc.; the storage data area may store data created by the use of the quantitative assessment device for the global stability of surrounding rocks of underground caverns. In addition, the memory may include a high-speed random access memory and may also include a non-volatile memory, such as a hard disk, a memory, a plug-in hard disk, a Smart Media Card (SMC), a Secure Digital (SD) card, a Flash Card, at least one disk memory device, a flash memory device, or other volatile solid-state memory devices.

When configured to execute the computer program stored in the memory 402, the processor 401 may specifically realize the following functions:

extracting, after determining an assessment task for global stability of a surrounding rock of a target underground cavern, initial data of the target underground cavern;

dividing, according to the initial data, the target underground cavern into different independent cavern units or cavern sections; and rating, according to a preset stability assessment strategy, the eight factors influencing the stability of surrounding rocks of cavern units or the cavern sections respectively, as a global stability assessment result of the target underground cavern.

Those skilled in the art may clearly understand that for the convenience and conciseness of descriptions, specific working processes of the quantitative assessment apparatus and device and corresponding units for the global stability of surrounding rocks of underground caverns described above may refer to the descriptions of the quantitative assessment method for the global stability of surrounding rocks of underground caverns in the corresponding embodiment as shown in FIG. 1, and the details will not be repeated here.

Those ordinary skilled in the art may understand that all or part of the steps in the various methods of the above embodiments may be completed by instructions, or controlling related hardware by the instructions, and the instructions may be stored in a computer-readable storage medium and loaded and executed by a processor.

Therefore, the present application provides a computer-readable storage medium, in which various instructions are stored, and the instructions can be loaded by a processor to execute the steps of the quantitative assessment method for the global stability of surrounding rocks of underground caverns in the corresponding embodiment of FIG. 1. For the specific operation, please refer to the descriptions of the quantitative assessment method for the global stability of surrounding rocks of underground caverns in the corresponding embodiment of FIG. 1, which will not be repeated here.

The computer-readable storage medium may include a Read Only Memory (ROM), a Random Access Memory (RAM), a magnetic disk or optical disk, etc.

Since the instructions stored in the computer-readable storage medium may execute the steps of the quantitative assessment method for the global stability of surrounding rocks of underground caverns in the corresponding embodiment of FIG. 1, the beneficial effects that can be achieved by the quantitative assessment method for the global stability of surrounding rocks of underground caverns in the corresponding embodiment of FIG. 1 can be realized, and the previous descriptions are referred for details, and will not be repeated here.

The quantitative assessment method, apparatus and device for the global stability of surrounding rocks of underground caverns and the computer-readable storage medium according to the present disclosure have been described in detail above. Specific examples are configured herein to explain the principles and implementations of the present application. The descriptions of the above embodiments are only configured to help to understand the method and the core idea of the present application.

Meanwhile, for those ordinary skilled in the art, there will be changes in the specific implementations and the application scope according to the idea of the present application. In summary, the content of the description should not be understood as a limitation on the present application.

What is claimed is:

1. A quantitative assessment method for global stability of surrounding rocks of underground-caverns, comprising:

extracting initial data of a target underground cavern, wherein the initial data comprises: geological structures, rock mass structure types, lithology, initial maximum principal stress values, buried depths, included angles between initial maximum principal stress directions and a cavern axis, dimensions, a cavern axis orientation and use functions of different positions of the target underground cavern;

dividing, according to the initial data, the target underground cavern into different independent cavern units or cavern sections; and rating, according to a preset stability assessment strategy, seven factors influencing a stability of surrounding rocks of the cavern units or the cavern sections respectively, as a global stability assessment result of the target underground cavern;

said dividing, according to the initial data, the target underground cavern into the different independent cavern units or cavern sections comprising:

dividing, according to the initial data, the target underground cavern into the different dividing, according to the initial data, the target underground cavern into the different independent cavern units or cavern sections in a preset similar judgment range;

the preset stability assessment strategy evaluating from the seven factors: a basic quality (BQ) index of the surrounding rocks, an uniaxial compressive strength $R_c$ of the surrounding rocks, a local stability condition of the surrounding rocks, a relaxation/damage condition of the surrounding rocks, a combined relationship between the initial maximum principal stress directions of the surrounding rocks and the cavern axis, a combined relationship between a main structural plane and the cavern axis, and groundwater;

the local stability condition of the surrounding rocks being specifically evaluated from four aspects: a local deformation stability of the surrounding rocks, a block stability of the surrounding rocks, a collapse tendency of the surrounding rocks and a rockburst tendency of the surrounding rocks;

said rating, according to the preset stability assessment strategy, the seven factors influencing the stability of the surrounding rocks of the cavern units or the cavern sections respectively, as the global stability assessment result of the target underground cavern comprising:

rating, according to the preset stability assessment strategy, the seven factors influencing the stability of the surrounding rocks of the cavern units or the cavern sections respectively; and accumulating the ratings of the seven factors, and confirming the accumulated ratings as stability assessment results of respective cavern units or cavern sections, as the global stability assessment result of the target underground cavern;

said accumulating the ratings of the seven factors, and said confirming the accumulated ratings as the stability assessment results of the respective cavern units or cavern sections comprising:

accumulating the ratings of the seven factors;

determining, based on preset global stability classifications of the surrounding rocks of the target underground cavern and rating ranges thereof, target global stability classifications corresponding to the accumulated ratings, the preset global stability classifications of the surrounding rocks of the target underground cavern being divided into four classifications: stable, basically stable, understable and unstable; and confirming the accumulated ratings and the target global stability classifications as the stability assessment results of the respective cavern units or cavern sections, and as the global stability assessment result of the target underground cavern;

during the rating, the BQ index of the surrounding rocks comprises:

Class I, BQ>550, Class II, 550≥BQ>450, and a corresponding rating interval of a rating $S_1$ of the BQ index of the surrounding rocks is 20≥$S_1$≥15; Class III, 450≥BQ>350 and the corresponding rating interval of the rating $S_1$ of the BQ index of the surrounding rocks is 15≥$S_1$≥10; Class IV, 350≥BQ>250 and the corresponding rating interval of the rating $S_1$ of the BQ index of the surrounding rocks is 10≥$S_1$≥5; Class V, 250≥BQ, and the corresponding rating interval of the rating $S_1$ of the BQ index of the surrounding rocks is 5>$S_1$≥0;

wherein the rating $S_1$ of the BQ index of the surrounding rocks is linearly interpolated from a lower limit of the corresponding rating interval of the rating $S_1$ of the BQ index of the surrounding rocks to an upper limit of the corresponding rating interval of the rating $S_1$ of the BQ index of the surrounding rocks according to the BQ index of the surrounding rocks; when there is no BQ index monitoring data available, the rating $S_1$ of the BQ index of the surrounding rocks is performed according to qualitative description of surrounding rocks characteristics of a site; when the BQ index of the surrounding rocks is Class I, the rating $S_1$ of the BQ index of the surrounding rocks is 20; when the surrounding rocks are hard and brittle and have a brittle failure tendency, the rating $S_1$ of the BQ index of the surrounding rocks is linearly interpolated from the upper limit of the corresponding rating interval of the rating $S_1$ of the BQ index of the surrounding rocks to the lower limit of the corresponding rating interval of the rating $S_1$ of the BQ index of the surrounding rocks according to the BQ index;

during the rating, rock strength $R_c/\sigma_{max}$ of the surrounding rocks comprises:

$R_c/\sigma_{max}$≥7, and a corresponding rating interval of a rating $S_2$ of the rock strength $R_c/\sigma_{max}$ of the surrounding rocks is 20≥$S_2$≥15; 7>$R_c/\sigma_{max}$≥4, and the corresponding rating interval of the rating $S_2$ of the rock strength $R_c/\sigma_{max}$ of the surrounding rocks is 15>$S_2$≥10; 4>$R_c/\sigma_{max}$≥2, and the corresponding rating interval of the rating $S_2$ of the rock strength $R_c/\sigma_{max}$ of the surrounding rocks is 10>$S_2$≥5; 2>$R_c/\sigma_{max}$, and the corresponding rating interval of the rating $S_2$ of the rock strength $R_c/\sigma_{max}$ of the surrounding rocks is 5>$S_2$≥0;

wherein the rating $S_2$ of the rock strength $R_c/\sigma_{max}$ of the surrounding rocks is linearly interpolated from a lower limit of the corresponding rating interval of the rating $S_2$ of the rock strength $R_c/\sigma_{max}$ of the surrounding rocks to an upper limit of the corresponding rating interval of the rating $S_2$ of the rock strength $R_c/\sigma_{max}$ of the surrounding rocks according to the rock strength $R_c/\sigma_{max}$ of the uniaxial compressive strength $R_c$ of the surrounding rocks to a maximum principal stress $\sigma_{max}$ of an initial ground stress; $R_c/\sigma_{max}$>10, and the rating $S_2$ of the rock strength $R_c/\sigma_{max}$ of the surrounding rocks is 20; $R_c/\sigma_{max}$<1, and the rating $S_2$ of the rock strength $R_c/\sigma_{max}$ of the surrounding rocks is 0;

during the rating, the local stability condition of the surrounding rocks comprises:

stable, and a corresponding rating interval of a rating $S_3$ of the local stability condition of the surrounding rocks is 20≥$S_3$≥15; basically stable, and the corresponding rating interval of the rating $S_3$ of the local stability condition of the surrounding rocks is 15>$S_3$≥10; understable, and the corresponding rating interval of the rating $S_3$ of the local stability condition of the surrounding rocks is 10>$S_3$≥5; unstable, and the corresponding rating interval of the rating $S_3$ of the local stability condition of the surrounding rocks is 5>$S_3$≥0; wherein the rating $S_3$ of the local stability condition of the surrounding rocks of a single failure type of a cavern unit or cavern section takes a lowest value in all ratings of the single failure type;

during the rating, the relaxation/damage condition of the surrounding rocks comprises:

3 meters (m)≥$D_r$ or 0.15≥$D_r/B$, and a corresponding rating interval of a rating $S_4$ of the relaxation/damage condition of the surrounding rocks is 10≥$S_4$≥8; 6 m≥$D_r$≥3 m or 0.3≥$D_r/B$>0.15, and the corresponding rating interval of the rating $S_4$ of the relaxation/damage condition of the surrounding rocks is 8≥$S_4$≥5; 9 m≥$D_r$>6 m or 0.45≥$D_r/B$>0.3, and the corresponding rating interval of the rating $S_4$ of the relaxation/damage condition of the surrounding rocks is 5>$S_4$≥2; $D_r$>9 m or $D_r/B$>0.45, and the corresponding rating interval of the rating $S_4$ of the relaxation/damage condition of the surrounding rocks is $2>S_4\geq 0$;

wherein a damage zone depth $D_r$ standard is adopted when a cavern span B>20 m, and a depth-cavern span ratio DI/B standard is adopted for others; $D_r$ takes an average value of a maximum relaxation/damage depth of a monitoring/analysis section or area; the rating $S_4$ of the relaxation/damage condition of the surrounding rocks is linearly interpolated from an upper limit of the corresponding rating interval of the rating $S_4$ of the relaxation/damage condition of the surrounding rocks to a lower limit of the corresponding rating interval of the rating $S_4$ of the relaxation/damage condition of the surrounding rocks according to a value of $D_r$ or $D_r/B$; when $D_r \geq 12$ m or $D_r/B \geq 0.6$, the rating $S_4$ of the relaxation/damage condition of the surrounding rocks is 0; in a survey and design stage, $D_r$ is predicted by numerical calculation integrated with a damage assessment index or similar physical simulation; in a construction stage, $D_r$ is obtained by an acoustic wave velocity test, borehole imaging or numerical calculation integrated with the damage assessment index; when a disturbance degree of a construction to the surrounding rocks is a target level, the rating $S_4$ of the relaxation/damage condition of the surrounding rocks takes the lower limit of the corresponding rating interval of the rating $S_4$ of the relaxation/damage condition of the surrounding rocks where the $D_r$ standard or the $D_r/B$ standard is located; when the local stability condition of the surrounding rocks takes an assessment result of the local deformation stability or the collapse tendency, the rating $S_4$ of the relaxation/damage condition of the surrounding rocks is 0;

during the rating, the combined relationship between the initial maximum principal stress directions of the surrounding rocks and the cavern axis comprises:

$20°\geq\gamma$, and a corresponding rating interval of a rating $S_5$ of the combined relationship between the initial maximum principal stress directions of the surrounding rocks and the cavern axis is $10\geq S_5 \geq 8$; $40°\geq\gamma>20°$, and the corresponding rating interval of the rating $S_5$ of the combined relationship between the initial maximum principal stress directions of the surrounding rocks and the cavern axis is $8>S_5\geq 6$; $70°\geq\gamma>45°$, and the corresponding rating interval of the rating $S_5$ of the combined relationship between the initial maximum principal stress directions of the surrounding rocks and the cavern axis is $6>S_5>3$; $\gamma>70°$, and the corresponding rating interval of the rating $S_5$ of the combined relationship between the initial maximum principal stress directions of the surrounding rocks and the cavern axis is $3>S_5>0$; wherein the rating $S_5$ of the combined relationship between the initial maximum principal stress directions of the surrounding rocks and the cavern axis is linearly interpolated from an upper limit of the corresponding rating interval of the rating $S_5$ of the combined relationship between the initial maximum principal stress directions of the surrounding rocks and the cavern axis to a lower limit of the corresponding rating interval of the rating $S_5$ of the combined relationship between the initial maximum principal stress directions of the surrounding rocks and the cavern axis according to a value of $\gamma$, $\gamma$ refers to an included angle between an initial maximum principal stress direction of the surrounding rocks and the cavern axis, and $\gamma$ is an acute angle;

during the rating, the combined relationship between the main structural plane and the cavern axis comprises:

$\alpha\geq 60°$, $\beta>70°$, and a corresponding rating of a rating $S_6$ of the combined relationship between the main structural plane and the cavern axis is side wall $S_6=8$ and vault $S_6=10$; $\alpha\geq 60°$, $70°>\beta\geq 45°$, and the corresponding rating of the rating $S_6$ of the combined relationship between the main structural plane and the cavern axis is the side wall $S_6=6$ and the vault $S_6=8$; $\alpha\geq 60°$, $45°>\beta\geq 20°$, and the corresponding rating of the rating $S_6$ of the combined relationship between the main structural plane and the cavern axis is the side wall $S_6=8$ and the vault $S_6=6$; $\alpha\geq 60°$, $20°>\beta$, the corresponding rating of the rating $S_6$ of the combined relationship between the main structural plane and the cavern axis is the side wall $S_6=10$ and the vault $S_6=2$, a is an included angle between a direction of the main structural plane and the cavern axis, and B is a dip angle of the main structural plane;

$60°>\alpha\geq 30°$, $\beta\geq 70°$, and the corresponding rating of the rating $S_6$ of the combined relationship between the main structural plane and the cavern axis is the side wall $S_6=6$ and the vault $S_6=8$; $60°>\alpha\geq 30°$, $70°>\beta\geq 45°$, and the corresponding rating of the rating $S_6$ of the combined relationship between the main structural plane and the cavern axis is the side wall $S_6=2$ and the vault $S_6=6$; $60°>\alpha\geq 300$, $45°>\beta\geq 20°$, and the corresponding rating of the rating $S_6$ of the combined relationship between the main structural plane and the cavern axis is the side wall $S_6=8$ and the vault $S_6=2$; $60°>\alpha\geq 30°$, $20°>\beta$, and the corresponding rating of the rating $S_6$ of the combined relationship between the main structural plane and the cavern axis is the side wall $S_6=10$ and the vault $S_6=0$;

$30°>\alpha$, $\beta\geq 70°$, the corresponding rating of the rating $S_6$ of the combined relationship between the main structural plane and the cavern axis is the side wall $S_6=2$ and the vault $S_6=6$; $30°>\alpha$, $70°>\beta\geq 45°$, and the corresponding rating of the rating $S_6$ of the combined relationship between the main structural plane and the cavern axis is the side wall $S_6=0$ and the vault $S_6=2$; $30°>\alpha$, $45°>\beta\geq 20°$, and the corresponding rating of the rating $S_6$ of the combined relationship between the main structural plane and the cavern axis is the side wall $S_6=6$ and the vault $S_6=0$; $30°>\alpha$, $20°>\beta$, and the corresponding rating of the rating $S_6$ of the combined relationship between main structural plane refers to discontinuities comprising a fault, a dislocation zone, a bedding plane, fissure, an altered fracture zone, and a dike zone which run through the target underground cavern and have a scale of Class II or below; when the main structural plane is exposed in the vault and the side wall at a same time, the rating $S_6$ of the combined relationship between the main structural plane and the cavern axis takes a lowest value of the main structural plane when exposed in the vault and the main structural plane when exposed in the side wall; when there are multiple groups of main structural planes, the rating $S_6$ of the combined relationship between the main structural plane and the cavern axis takes a lowest of all main structural planes; if there is no main structural plane influencing the stability of the surrounding rocks of the cavern units or the cavern sections, the rating $S_6$ of the combined relationship between the main structural plane and the cavern axis is 10; during the rating, the groundwater comprises:

10≥Q, dry without water seepage, and a corresponding rating interval of a rating $S_7$ of the groundwater is 5≥$S_7$≥4; 25≥Q>10, wet or dripping water, and the corresponding rating interval of the rating $S_7$ of the groundwater is 4>$S_7$≥3; 125≥Q>25, rain or linear water, and the corresponding rating interval of the rating $S_7$ of the groundwater is 3>$S_7$≥1; Q>125, gushing water, the corresponding rating interval of the rating $S_7$ of the groundwater is 1>$S_7$≥0; wherein a unit of water quantity Q per 10 m cavern length is a liter per minute (L/min)·10 m; the rating $S_7$ of the groundwater is linearly interpolated from an upper limit of the corresponding rating interval of the rating $S_7$ of the groundwater to a lower limit of the corresponding rating interval of the rating $S_7$ of the groundwater according to a common logarithm of Q; when there is no Q monitoring data available, the rating $S_7$ of the groundwater is performed according to a description of a groundwater output state; when 250≥Q, the rating $S_7$ of the groundwater is 0; in the survey and design stage, the lower limit of the corresponding rating interval of the rating $S_7$ of the groundwater is selected according to a buried condition of the groundwater of the site;

during the rating, the local deformation stability of the surrounding rocks in the local stability condition of the surrounding rocks comprises:

stable, a corresponding rating interval of a rating $S_9$ of the local deformation stability of the surrounding rocks is 20≥$S_9$≥15, a classification standard in the survey and design stage is $$\frac{Uallow}{3} \geq U,$$

a classification standard in the construction stage is 0.2 millimeters per day (mm/d)≥v or $$\frac{Uallow}{3} \geq U$$

for five consecutive days; basically stable, the corresponding rating interval of the rating $S_9$ of the local deformation stability of the surrounding rocks is 15>$S_9$≥10, the classification standard in the survey and design stage is $$\frac{2Uallow}{3} \geq U > \frac{Uallow}{3},$$

and the classification standard in the construction stage is 0.5 mm/d≥v>0.2 mm/d or $$\frac{2Uallow}{3} \geq U > \frac{Uallow}{3}$$

for five consecutive days; understable, the corresponding rating interval of the rating $S_9$ of the local deformation stability of the surrounding rocks is 10>$S_9$≥5, the classification standard in the survey and design stage is $$Uallow \geq U > \frac{2Uallow}{3},$$

and the classification standard in the construction stage is 0.5 mm/d<v≤1 mm/d or $$Uallow \geq U > \frac{2Uallow}{3}$$

for five consecutive days; or unstable, the corresponding rating interval of the rating $S_9$ of the local deformation stability of the surrounding rocks is 5>$S_9$≥0, the classification standard in the survey and design stage is U>$U_{allow}$, and the classification standard in the construction stage is v>1 mm/d or U>$U_{allow}$ for five consecutive days;

wherein U, v and $U_{allow}$ are a relative displacement, a deformation rate and an allowable relative displacement value of measuring points in key parts of the target underground cavern respectively; a value of $U_{allow}$ should be in accordance with technical specifications of rock and soil anchor stock and shotcrete support engineering; the rating $S_9$ of the local deformation stability of the surrounding rocks is linearly interpolated from an upper limit of the corresponding rating interval of the rating $S_9$ of the local deformation stability of the surrounding rocks to a lower limit of the corresponding rating interval of the rating $S_9$ of the local deformation stability of the surrounding rocks according to a value of U or v; the rating $S_9$ of the local deformation stability of the surrounding rocks is 0 when v>2 mm/d in five consecutive days or U>1.3$U_{allow}$; when double standards of U and v are adopted for rating, an assessment result of the double standards of U and v with a lowest rating is taken;

during the rating, the block stability of the surrounding rocks in the local stability condition of the surrounding rocks comprises:

stable, a corresponding rating interval of a rating $S_{10}$ of the block stability of the surrounding rocks is 20≥$S_{10}$≥15, and the classification standard is $F_s$≥$F_{s\_allow}$; basically stable, the corresponding rating interval of the rating $S_{10}$ of the block stability of the surrounding rocks is 15>$S_{10}$≥10, and the classification standard is $F_{s\_allow}$>$F_s$≥0.9$F_{s\_allow}$; understable, the corresponding rating interval of the rating $S_{10}$ of the block stability of the surrounding rocks is 10>$S_{10}$≥5, and the classification standard is 0.9$F_{s\_allow}$>$F_s$>1.0; unstable, the corresponding rating interval of the rating $S_{10}$ of the block stability of the surrounding rocks is 5>$S_{10}$≥0, and the classification standard is 1.0>$F_s$;

wherein the rating $S_{10}$ of the block stability of the surrounding rocks is linearly interpolated from a lower limit of the corresponding rating interval of the rating $S_{10}$ of the block stability of the surrounding rocks to an upper limit of the corresponding rating interval of the rating $S_{10}$ of the block stability of the surrounding rocks according to a block safety factor $F_s$; when $F_s>1.1F_{s\_allow}$, the rating $S_{10}$ of the block stability of the surrounding rocks is 20; when a potential unstable block volume $V>30$ m³, the rating $S_{10}$ of the block stability of the surrounding rocks is the lower limit of the corresponding rating interval of the rating $S_{10}$ of the block stability of the surrounding rocks where the rating $S_{10}$ of the block stability of the surrounding rocks is located; an allowable block safety factor $F_{s\_allow}$ is a minimum safety factor according to a design code of an underground powerhouse of a hydropower station;

during the rating, the collapse tendency of the surrounding rocks in the local stability condition of the surrounding rocks comprises:
very little, a corresponding rating interval of a rating $S_{11}$ of the collapse tendency of the surrounding rocks is $20 \geq S_{11} \geq 15$, the classification standard in the survey and design stage is 1 m≥H, and the classification standard in the construction stage is 1 m≥H or 10 m³≥V; slight, the corresponding rating interval of the rating $S_{11}$ of the collapse tendency of the surrounding rocks is $15>S_{11} \geq 10$, the classification standard in the survey and design stage is 3 m≥H>1 m, and the classification standard in the construction stage is 3 m>H>1 m or 30 m³≥V>10 m³; medium, the corresponding rating interval of the rating $S_{11}$ of the collapse tendency of the surrounding rocks is $10>S_{11} \geq 5$, the classification standard in the survey and design stage is 6 m≥H>3 m, and the classification standard in the construction stage is 6 m≥H>3 m or 100 m³≥V>30 m³; strong, the corresponding rating interval of the rating $S_{11}$ of the collapse tendency of the surrounding rocks is $5>S_{11} \geq 0$, the classification standard in the survey and design stage is H>6 m, and the classification standard in the construction stage is H>6 m or V>100 m³;
wherein the rating $S_{11}$ of the collapse tendency of the surrounding rocks is linearly interpolated from an upper limit of the corresponding rating interval of the rating $S_{11}$ of the collapse tendency of the surrounding rocks to a lower limit of the corresponding rating interval of the rating $S_{11}$ of the collapse tendency of the surrounding rocks according to a collapse height H or a common logarithm of a collapse volume V; when H≥9 m or V≥300 m³, the rating $S_{11}$ of the collapse tendency of the surrounding rocks is 0; when double standards of H and V are adopted for rating, an assessment result of the double standards of H and V with a lowest rating is taken;

during the rating, the rockburst tendency of the surrounding rocks in the local stability condition of the surrounding rocks comprises:
very little, a corresponding rating interval of a rating $S_{12}$ of the rockburst tendency of the surrounding rocks is $20 \geq S_{12} \geq 15$, the classification standard in the survey and design stage is $0.3 \geq \sigma_\theta/R_c$, and the classification standard in the construction stage is $0.3 \geq \sigma_\theta/R_c \geq 0$ or 0.1 m>$D_f$; slight, the corresponding rating interval of the rating $S_{12}$ of the rockburst tendency of the surrounding rocks is $15>S_{12} \geq 10$, the classification standard in the survey and design stage is $0.5 \geq \sigma_\theta/R_c>0.3$, and the classification standard in the construction stage is $0.5 \geq \sigma_\theta/R_c>0.3$ or 0.5 m≥$D_f$>0.1 m; medium, the corresponding rating interval of the rating $S_{12}$ of the rockburst tendency of the surrounding rocks is $10>S_{12} \geq 5$, the classification standard in the survey and design stage is $0.7 \geq \sigma_\theta/R_c>0.5$, and the classification standard in the construction stage is $0.7 \geq \sigma_\theta/R_c>0.5$ or 1 m≥$D_f$>0.5 m; strong, the corresponding rating interval of the rating $S_{12}$ of the rockburst tendency of the surrounding rocks is $5>S_{12} \geq 0$, the classification standard in the survey and design stage is $\sigma_\theta/R_c>0.7$, and the classification standard in the construction stage is $\sigma_\theta/R_c>0.7$ or $D_f>1$ m;
wherein the rating $S_{12}$ of the rockburst tendency of the surrounding rocks is linearly interpolated from an upper limit of the corresponding rating interval of the rating $S_{12}$ of the rockburst tendency of the surrounding rocks to a lower limit of the corresponding rating interval of the rating $S_{12}$ of the rockburst tendency of the surrounding rocks according to a ratio $\sigma_\theta/R_c$ of a tangential compressive stress $\sigma_\theta$ of the surrounding rocks to the uniaxial compressive strength $R_c$ of the surrounding rocks, or linearly interpolated from the upper limit of the corresponding rating interval of the rating $S_{12}$ of the rockburst tendency of the surrounding rocks to the lower limit of the corresponding rating interval of the rating $S_{12}$ of the rockburst tendency of the surrounding rocks according to a spalling/brittle failure depth $D_f$; when $\sigma_\theta/R_c \geq 0.9$ or $D_f \geq 3$ m, the rating $S_{12}$ of the rockburst tendency of the surrounding rocks is 0; when double standards of $\sigma_\theta/R_c$ and $D_f$ are configured for rating, an assessment result of the double standards of $\sigma_\theta/R_c$ and $D_f$ with a lowest rating is taken; and $\sigma_\theta$ is obtained by an elastic numerical calculation result of underground cavern excavation; and during the rating, the stability assessment results of the respective cavern units or cavern sections comprise:
stable, a corresponding rating interval of a rating S of the stability assessment results of the respective cavern units or cavern sections is $100 \geq S \geq 80$; basically stable, the corresponding rating interval of the rating S of the stability assessment results of the respective cavern units or cavern sections is $80>S \geq 60$; understable, the corresponding rating interval of the rating S of the stability assessment results of the respective cavern units or cavern sections is $60>S \geq 30$; unstable, the corresponding rating interval of the rating S of the stability assessment results of the respective cavern units or cavern sections is $S<30$;
wherein the quantitative assessment method further comprises: guiding an excavation operation on the target underground cavern according to the global stability assessment result of the target underground cavern.

2. A quantitative assessment device for the global stability of the surrounding rocks of the underground cavern, comprising a processor and a memory, wherein a computer program is stored in the memory, and the processor executes the quantitative assessment method according to claim 1 when calling the computer program in the memory.

3. A non-transitory computer-readable storage medium, wherein the non-transitory computer-readable storage medium stores various instructions which are suitable for being loaded by a processor to execute the quantitative assessment method according to claim 1.

* * * * *